US008996742B1

(12) United States Patent
Spinner et al.

(10) Patent No.: US 8,996,742 B1
(45) Date of Patent: Mar. 31, 2015

(54) METHOD FOR AUTOMATICALLY TESTING VIDEO DISPLAY/MONITORS USING EMBEDDED DATA STRUCTURE INFORMATION

(71) Applicants: Advanced Testing Technologies, Inc., Hauppauge, NY (US); Eli Levi, Dix Hills, NY (US)

(72) Inventors: Robert Spinner, East Northport, NY (US); Eli Levi, Dix Hills, NY (US)

(73) Assignee: Advanced Testing Technologies, Inc., Hauppauge, NY (US)

( * ) Notice: Subject to any disclaimer, the term of this patent is extended or adjusted under 35 U.S.C. 154(b) by 0 days.

(21) Appl. No.: 14/044,054

(22) Filed: Oct. 2, 2013

Related U.S. Application Data

(60) Provisional application No. 61/860,677, filed on Jul. 31, 2013.

(51) Int. Cl.
*G06F 3/00* (2006.01)
*H04N 17/04* (2006.01)
*G09G 5/00* (2006.01)
*G09G 3/00* (2006.01)
*H04N 5/765* (2006.01)

(52) U.S. Cl.
CPC ....... *H04N 17/045* (2013.01); *G09G 2370/047* (2013.01); *G09G 5/006* (2013.01); *G09G 3/006* (2013.01); *H04N 5/765* (2013.01)
USPC .......... 710/8; 710/9; 710/10; 710/11; 710/12; 710/13; 710/14

(58) Field of Classification Search
CPC . G09G 3/006; G09G 5/006; G09G 2370/047; H04N 5/765; H04N 17/004
See application file for complete search history.

(56) References Cited

U.S. PATENT DOCUMENTS

| | | | | |
|---|---|---|---|---|
| 5,943,029 A * | 8/1999 | Ross | | 345/11 |
| 6,091,447 A * | 7/2000 | Gershfeld | | 348/180 |
| 6,323,828 B1 | 11/2001 | Perez | | |
| 6,396,536 B1 * | 5/2002 | Howell et al. | | 348/180 |
| 6,944,596 B1 * | 9/2005 | Gray et al. | | 705/321 |
| 7,180,477 B2 * | 2/2007 | Howell | | 345/10 |
| 7,334,054 B2 * | 2/2008 | Anderson | | 710/15 |
| 7,812,832 B2 * | 10/2010 | Mendelson et al. | | 345/204 |
| 7,843,444 B2 * | 11/2010 | Huang et al. | | 345/204 |
| 8,356,282 B1 | 1/2013 | Leippe et al. | | |
| 8,390,687 B2 | 3/2013 | Glen et al. | | |
| 2002/0036631 A1 * | 3/2002 | Perez | | 345/204 |
| 2003/0193565 A1 * | 10/2003 | Wen | | 348/184 |

(Continued)

*Primary Examiner* — Jing-Yih Shyu
(74) *Attorney, Agent, or Firm* — Brian Roffe

(57) ABSTRACT

Method and system for testing any type of video display, video monitor or other device that produces a video signal, and that is capable of providing information about the video and optionally audio specifications and/or capabilities of the output signal to an external device when coupled thereto. The external device obtains the information about the specifications and/or capabilities and based thereon, assembles one or more pre-defined tests from a test database/repository containing tests to enable testing of compliance of the video signal producing device to those specifications and/or capabilities. This compliance testing may entail generating video or audio content at a source generator, providing it to the video signal producing device, and determining the accuracy of the output of the video signal producing device to the input content. A determination of the results of this test may be provided to an operator of the testing apparatus.

18 Claims, 4 Drawing Sheets

(56) References Cited

U.S. PATENT DOCUMENTS

| | | | |
|---|---|---|---|
| 2003/0196190 A1* | 10/2003 | Ruffolo et al. | 717/124 |
| 2008/0120521 A1* | 5/2008 | Poisson et al. | 714/26 |
| 2012/0136612 A1* | 5/2012 | Vanderhoff et al. | 702/119 |
| 2012/0139973 A1* | 6/2012 | Tsai | 345/690 |
| 2012/0266021 A1* | 10/2012 | Tian et al. | 714/27 |
| 2013/0326466 A1* | 12/2013 | Rachelson et al. | 717/101 |

* cited by examiner

METHOD FOR AUTOMATICALLY TESTING VIDEO DISPLAY/MONITORS USING EMBEDDED DATA STRUCTURE INFORMATION

CROSS-REFERENCE TO RELATED APPLICATION

This application claims priority of U.S. provisional patent application Ser. No. 61/860,677 filed Jul. 31, 2013, which is incorporated by reference herein.

FIELD OF THE INVENTION

The present invention relates generally to automatic testing of a video display/monitor based on information embedded within the display/monitor itself, i.e., in hardware and/or software componentry of the display/monitor.

The present invention also relates generally to apparatus and methods for automatically testing a video display/monitor with an optional audio capability based on information included in, on and/or within memory components of the display/monitor, which information relates to video and optionally audio specifications and/or capabilities of the display/monitor.

BACKGROUND OF THE INVENTION

For more than about 10 years, personal computers (PCs) and multimedia devices, such as video monitors, have contained data structures available at the user interface that describe its capabilities to whatever multimedia source it is connected to. These data structures have evolved over the years via a multitude of standards such as:
  DDC (Display Data Channel)
  E-DDC (Enhanced Display Data Channel)
  EDID (Extended Display Identification Data)
  E-EDID (Enhanced Extended Display Identification Data)
  EIA/CEA-861 Extension Blocks
to name a few.

Informational background to the invention is set forth in U.S. Pat. No. 8,356,282 and U.S. patent application Ser. No. 13/238,588 filed Sep. 21, 2011, both of which are incorporated by reference herein.

OBJECTS AND SUMMARY OF THE INVENTION

An object of at least one embodiment of the present invention is to provide a universal automated method for testing a display component's function and/or performance based on unique information residing within the display component, e.g., a display/monitor. Through the use of a processor and a software repository of tests, a series of tests can be automatically generated to test devices such as a display/monitor to its described/declared performance with little or no operator interaction.

For example, in a non-limiting, exemplifying method for preparing for testing a video signal producing device in accordance with the invention, the video signal producing device is interrogated to cause an Extended Display Identification Data (EDID) data structure of the video signal producing device to be directed to a processor, and at the processor from the EDID data structure, at least one test is determined that when performed, enables assessment of compliance of the video signal producing device with at least one specification and/or capability of the video signal producing device.

The method may also entail retrieving the determined test(s) from one or more test databases/repositories that each store a plurality of different tests. These databases and repositories may be situated at a common location or situated at different locations and linked to one another. The method may also entail directing the determined test(s) to a source generator coupled to the video signal producing device and that will generate and output a signal to the video signal producing device to enable output of the video signal producing device to be used to assess compliance with the specification and/or capability. Often, a test of functional capabilities of the video signal producing device is determined and applied. Additionally or alternatively, a test of performance capabilities of the video signal producing device may be determined and applied.

The specification or capability may relate to a video characteristic of the video signal producing device, or to an audio characteristic of the video signal producing device.

Each test may be created by coupling a video signal producing device compliant with the specification or capability to the processor, and determining parameters for the test based on output of the video signal producing device compliant with the specification or capability.

Further, the method may include automatically generating code for storing on computer-readable media based on the determined test(s) and for execution by a processor interacting with the computer-readable media to provide for performance of the test(s).

A system for testing a video signal producing device in accordance with the invention includes, in one embodiment, a processor, a test database/repository containing a plurality of tests that when each is executed on the video signal producing device, test a specification and/or capability of the video signal producing device, and an interrogation module that directs an interrogation command to the video signal producing device to cause an Extended Display Identification Data (EDID) data structure of the video signal producing device to be directed to said processor. The processor is configured to determine from the received EDID data structure, at least one test to perform to enable assessment of compliance of the video signal producing device with at least one specification or capability of the video signal producing device.

The system may optionally include a source generator that is directed by said processor to generate a signal based on the determined test and output the generated signal to the video signal producing device. As such, output of the video signal producing device enables assessment of compliance with the specification or capability. The source generator may be coupled to the video signal producing device via a bus.

Another method for testing a video signal producing device in accordance with the invention includes querying the video signal producing device via a bus to obtain an Extended Display Identification Data (EDID) data structure of the video signal producing device, parsing, at a processor, the results of the query and generating a list including at least one specification or capability of the video signal producing device, and identifying at least one test to perform to enable assessment of compliance of the video signal producing device with each specification or capability of the video signal producing device on the list. Then, the identified test(s) is/are assembled and the assembled test(s) is/are performed on the video signal producing device to assess compliance of the video signal producing device with each specification or capability of the video signal producing device.

When multiple tests are determined to be performed, assembling the tests may entail grouping the tests into a plurality of entry points, and grouping the entry points into a test plan, and then managing the entry points to enable selection of one or more specific ones of the entry points to execute or bypass.

The specification or capability may relate to a video characteristic of the video signal producing device and/or an audio characteristic of the video signal producing device. In the latter case, the method may entail parsing, at a processor, the results of the query and generating a list including at least one audio specification or capability of the video signal producing device, identifying at least one audio test to perform to enable assessment of compliance of the video signal producing device with each audio specification or capability of the video signal producing device on the list, and assembling the identified audio test(s). The assembled audio test(s) is/are performed on the video signal producing device to assess compliance of the video signal producing device with each audio specification or capability of the video signal producing device.

The invention will be described in detail with reference to some preferred embodiments of the invention illustrated in the figures in the accompanying drawing. However, the invention is not confined to the illustrated and described embodiments alone.

BRIEF DESCRIPTION OF THE DRAWINGS

Additional objects of the invention will be apparent from the following description of the preferred embodiment thereof taken in conjunction with the accompanying non-limiting drawings, in which.

DETAILED DESCRIPTION OF THE INVENTION

Figure 1:
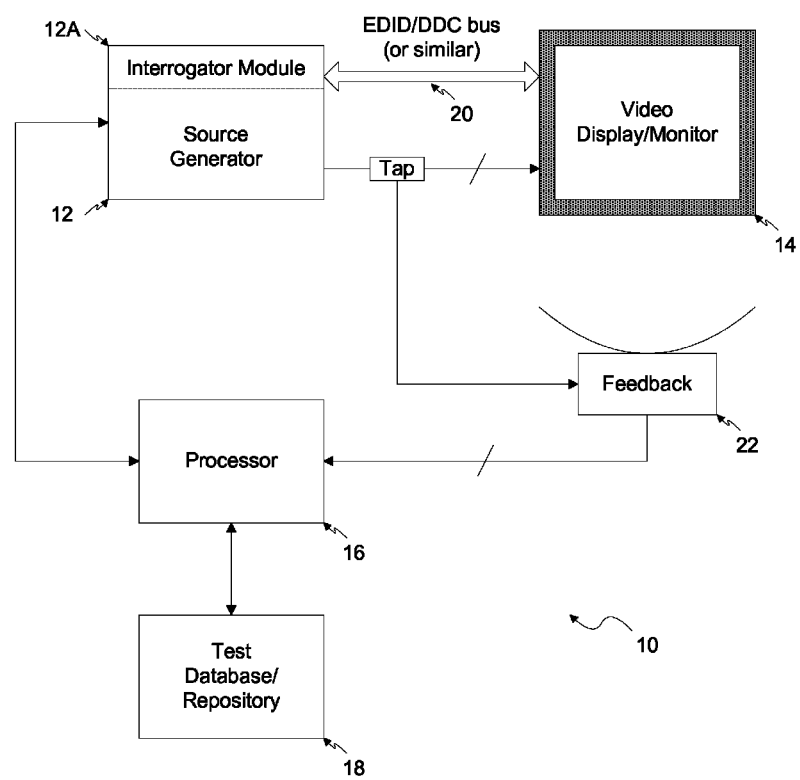
FIG. 1 reflects a non-limiting embodiment of a general arrangement of a display/monitor tester in accordance with the invention.

Preferred embodiments of the invention will be described with reference to FIGS. 1-3 wherein like reference numerals refer to the same or similar elements.

EDID (Extended Display Identification Data) is a data structure defined by a standard published by the Video Electronics Standards Association (VESA). The EDID data structure is provided by a digital display to describe its capabilities to whatever video source is attached to it. The EDID channel is based upon the I²C (Inter-Integrated Circuit) bus architecture and usually resides in a serial PROM (programmable read-only memory) or EEPROM (electrically erasable PROM) located within the display/video monitor. Basic EDID is implemented as a 128 byte data structure, although through the use of one or more extensions, E-EDID information can support up to 32 Kbytes of data. The EDID typically includes manufacturer name and serial number, product type, phosphor or filter type, timings supported by the display, display size, luminance data and (for digital displays only) pixel mapping data.

Due to the vast number of video manufacturers/models, the ability to test any given display/monitor on-the-fly presents an insurmountable challenge due to the infinite number of permutations of test parameters/specifications involved. The ability to query the display/monitor for its stored information and capabilities to develop an automated test program set (TPS) represents a novel and unique approach to testing display/video monitors.

The embodiment of the invention as shown schematically in FIG. 1 has the capability to automatically test any one of a plurality of different display/video monitors based on EDID data structure information associated with each display/video monitor. Nonetheless, a tester in accordance with the invention may be designed to test only a single type of display/video monitor.

The tester 10 includes a video generator source or source generator 12 that is temporarily coupled to the video display/monitor 14 being tested via an EDID/DDC bus or similar coupling structure 20, a processor 16 coupled to the source generator 12 and a test database/repository 18 coupled to the processor 16. The various electrical or data couplings in the tester 10 may be permanent or temporary couplings as desired and may be any known electrical/information/signal coupling arrangement known in the art to which the invention pertains.

The processor 16 is coupled to the test database/repository 18 in such a way that the processor 16 can access predefined and stored tests in the test database/repository 18. The hierarchy for storing such tests and the protocol for the processor 16 to access the test database/repository 18 to retrieve one or more desired tests may be any technique known to those skilled in the art to which this invention pertains.

Feedback 22 from the video display/monitor 14 is obtained from an operator, who is prompted with a series of questions regarding the video images sourced from the source generator 12. The responses to the questions are provided to the processor 16 for analysis.

To facilitate such feedback 22, the signal from the source generator 12 going to the video display/monitor 14 is tapped into, represented by the "TAP" in FIG. 1. To provide for the interception of the signal, the TAP may be in the form of a simple Tee, a coupler or buffered connection, or any other known signal interception device known to those skilled in the art to which this invention pertains. The Tee is a passive connection but provides no isolation; the coupler is also typically passive and provides some isolation but the amplitude at the coupled port is reduced relative to the main through ports; the buffer is an active connection providing isolation and typically unity gain (same amplitude).

Figure 2:
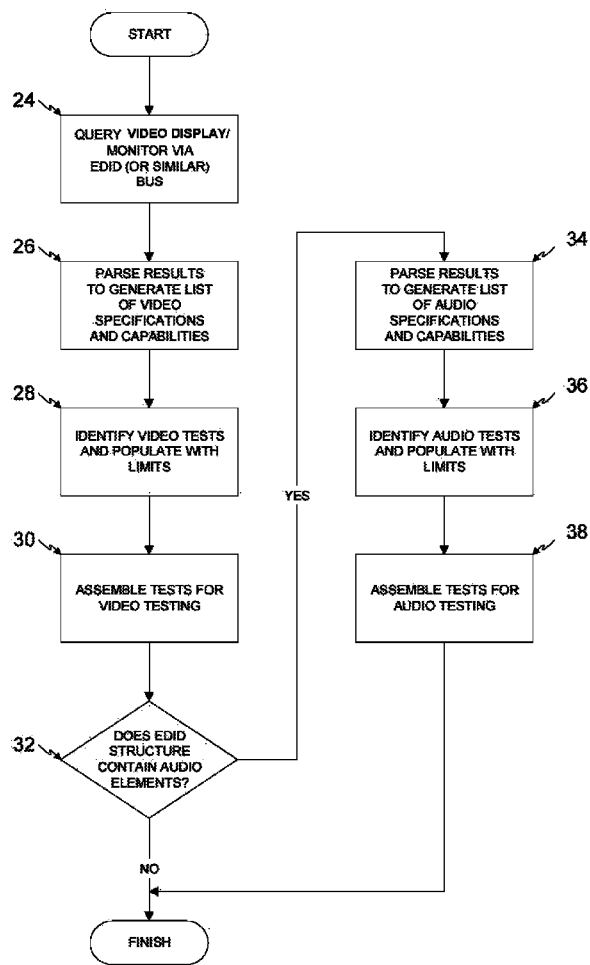
FIG. 2 shows a sample flow chart for developing test program set (TPS) code from EDID (or similar) data structure information.

The flow chart in FIG. 2 reflects an itemized breakdown of the steps involved in implementing an automated test approach using, for example, tester 10 illustrated in FIG. 1. In step 24, the source generator 12 would initiate a query of the EDID information associated with the video display/monitor 14 over the EDID (or similar) bus 20. To this end, the source generator 12 is configured to include an interrogation module 12A embodied as a hardware component and/or as a software program resident in computer-readable media. Initiation of the interrogation module 12A may occur when the video display/monitor 14 is initially coupled to the source generator 12. The purpose of the interrogation module 12A is to solicit manufacturer specified field elements of the EDID data structure embedded in, on or within the video display/monitor 14. The video display/monitor 14 is configured, constructed or otherwise provided with EDID data structure. For example, the EDID data structure may be embodied in computer readable media of the video display/monitor 14 or otherwise embedded therein. This interrogation may take the form of a command directed form the interrogation module 12A to the video display/monitor 14 to cause the video display/monitor 14 to interpret the command and provide the desired responsive information.

Although FIG. 1 shows the interrogation module 12A as part of the source generator 12, the interrogation module 12A may be separate from the source generator 12, yet when initiated, directs an interrogation command to the video display/monitor 14 to cause the EDID data structure to be provided to the source generator 12.

The responsive EDID information, and any extension(s) if applicable, would be provided to the source generator 12 and then to the processor 16. In step 26, the responsive information is parsed by the processor 16 to generate a list of video specifications and/or capabilities that would be applicable to the video display/monitor 14 under test. A computer program that receives the responsive information and outputs the list of video specifications and/or capabilities may be used and may be resident in a common processing unit with the processor 16 or separate therefrom yet electrically connected thereto.

Using these video specifications and capabilities in the list generated by the processor 16, the processor 16 identifies the appropriate set(s) of video tests, accesses the test database/repository 18 to retrieve the tests in each set, and populates each test in each set of tests with limits, step 28. Then, the processor assembles a unique TPS based on the pre-defined database/repository of tests that pertain to display/video monitor testing, step 30.

As part of this process, the invention may utilize software methods and algorithms detailed in U.S. Pat. No. 8,356,282, assigned to Advanced Testing Technologies, Inc, the current assignee.

Figure 3:
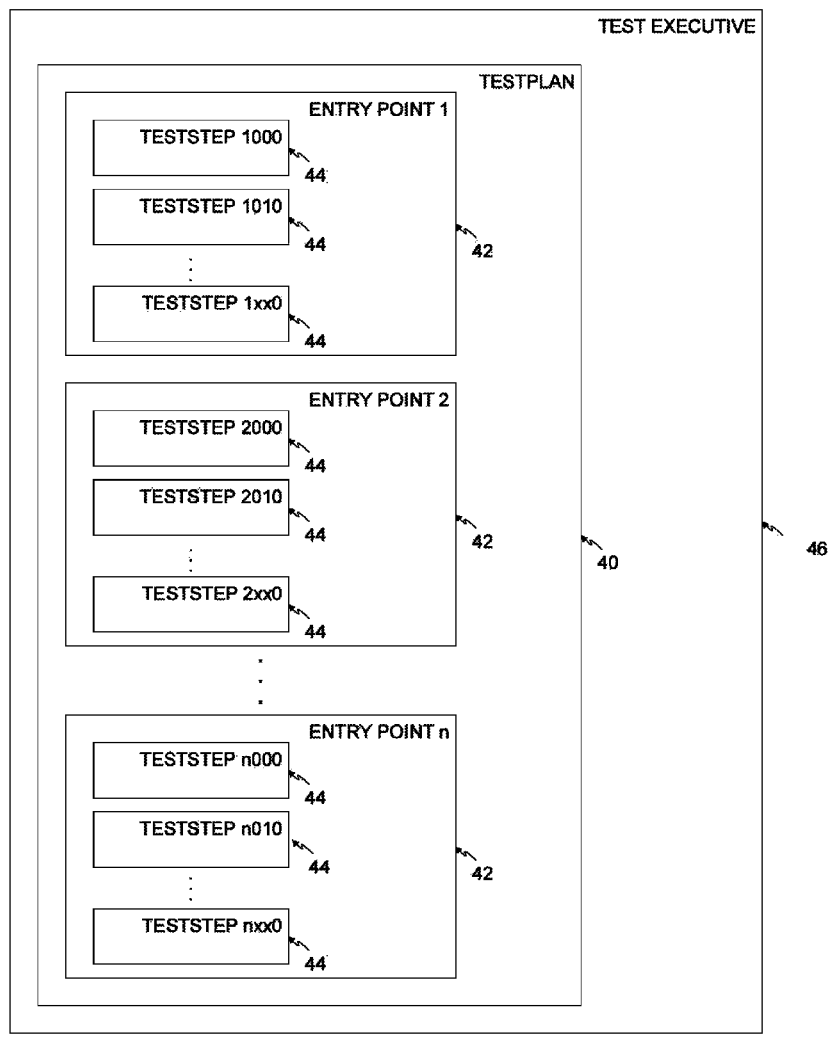
FIG. 3 shows a sample TPS structure for performing automatic testing of a display/video monitor as an example of a video signal producing device that can be tested in accordance with the invention.

The TPS may implement a test plan 40, or top level outline which defines the groups of tests to be performed as shown in FIG. 3. Beneath the test plan 40 is one or more entry points 42, each of which comprise a group of similar tests. At the lowest level is the teststep 44 or individual test that is to be performed. The TPS is managed by a test executive 46 which handles the program flow and allows the operator to select which entry points 42 are executed/bypassed, loop on selected teststep(s) 44 and, in certain cases, perform fault isolation through the use of diagnostic teststep(s) 44 and conditional flow within the test executive 46.

The capability of video test instrumentation is primarily limited to commercial standard video format frame capture coupled with basic timing and analog component measurement/analysis. Because of the complexity, verification of image content is often limited to that of very basic human pattern recognition, such as vertical or horizontal bars, grayscale, checkerboards or other images with easily discernable attributes for the user/operator to analyze through visual comparison. Image content is often a critical requirement in the pass/fail criterion of a system. In a most basic form, feedback from the display/video monitor is by the operator, who is prompted with a series of questions regarding the video images sourced from the video generator source.

Figure 4:
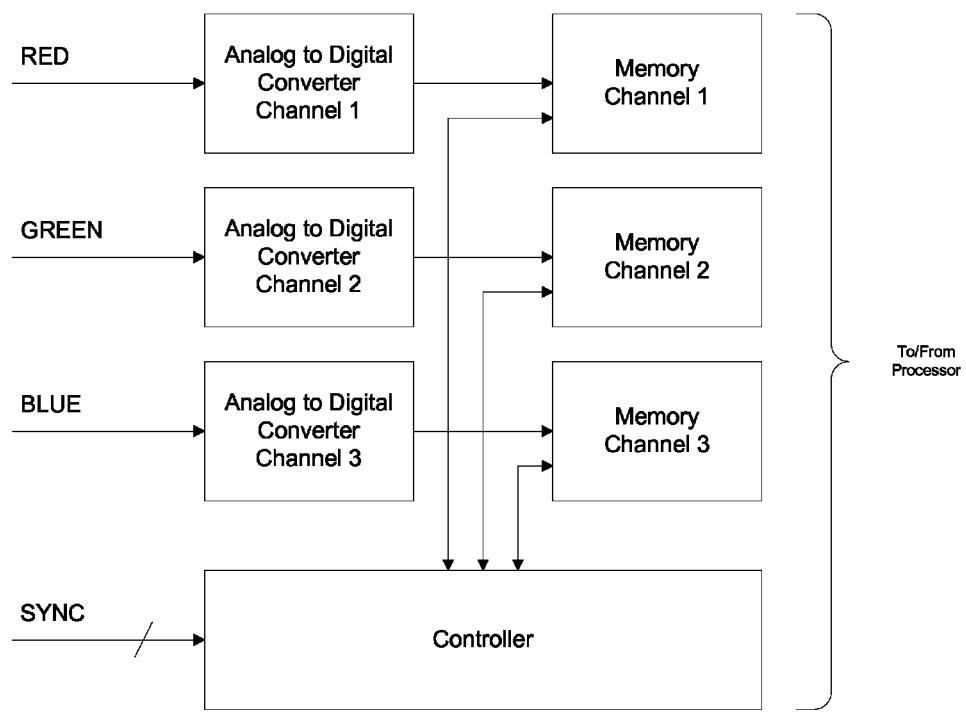
FIG. 4 shows an example of real-time capture hardware that may be used instead of the feedback shown in FIG. 1.

Referring now to FIG. 4, in a preferred embodiment, real time capture (RTC) hardware may be provided that works in concert with the video source, i.e., source generator 12, to perform video frame capture and make the process fully automated. This RTC hardware would essentially takes the place of the feedback 22 in FIG. 1, i.e., tap into, intercept or otherwise receive the signal being directed form the source generator 12 to the video display/monitor 14. In a preferred embodiment, the RTC hardware would interface with an image sensor/camera/colorimeter/photodetector for feedback of the displayed video image, which device is referred to as a sensor system and is also a possible component of the feedback 22 shown in FIG. 1. Any type of sensor system which processes an image, or a combination of such sensor systems, may be used for feedback in the RTC hardware.

In an embodiment where a camera (such as a CMOS or CCD) is used, separate red/green/blue channels along with horizontal/vertical sync might typically be used. The color channels each feed to a respective analog to digital converters which in turn feeds to a respective memory channel. From the memory channels, signals are provided to the controller, which also receives the sync. Since the system typically deals with performance oriented hardware, a composite video (R/G/B along with sync) would probably not be used, although it is still an option for the invention.

Alternate embodiments of the invention might include separate sensors for chrominance and luminance, but in no way is intended to limit the scope of the invention. The automated testing can encompass functional tests as well as performance tests relating to the video portions of the display/monitor.

Some display/monitors may also contain audio elements in addition to video hardware. Later versions of EDID data structures, specifically EIA/CEA-861 extension blocks, have addressed this by including data for audio data blocks (containing short audio descriptors) and speaker allocation data blocks (containing information about the speaker configuration of the display device).

In a preferred embodiment, an additional source capable of generating waveforms with the audio frequency range and appropriate amplitude could be implemented to test one or more of the audio portions of the display/monitor. The automated testing can encompass functional tests as well as performance tests relating to the audio portions of the display/monitor.

Referring back to FIG. 2, after step 30, a determination is made by the processor 16 in step 32 whether the EDID data structure contains an audio element. If not, the test retrieval stage ends and the assembled tests may be used for testing the video specifications and capabilities of the video display/monitor 14 through the coupling to the source generator 12. The manner in which the assembled tests are used to test the video display/monitor 14 via the source generator 12 may be any testing technique descried herein or otherwise known to those skilled in the art, but is preferably that described with reference to FIG. 3 above.

If the EDID data structure contains an audio element as determined in step 32, the EDID information is parsed by the processor 16 to generate a list of audio specifications and/or capabilities that would be applicable to the video display/monitor 14 under test, step 34. A computer program that receives the responsive information and outputs the list of audio specifications and/or capabilities may be used and may be resident in a common processing unit with the processor 16 or separate therefrom yet electrically connected thereto.

Using these audio specifications and capabilities in the list generated by the processor 16, the processor 16 identifies the appropriate set(s) of audio tests, accesses the test database/repository 18 to retrieve the audio tests in each set, and populates each test in each set of audio tests with limits, step 36. Then, the processor 16 assembles a unique TPS based on the pre-defined database/repository of audio tests that pertain to display/video monitor testing, step 38.

To further automate the testing of display/video monitors and enhance the accuracy of measurements therein, one or more embodiments of the present invention incorporate software methods and algorithms as outlined in U.S. patent application Ser. No. 13/238,588 filed Sep. 21, 2011, and that are incorporated by reference herein. To this end, a known good display/monitor can serve as a 'golden template' for which test limits can be captured automatically, providing a level of refinement as well as simplifying the overall development of a TPS for a specified make/model of display/video monitor. The TPS code generated by the invention may be native to the invention but is not necessarily limited in that manner.

It is envisioned that through the use of code translators, one or more embodiments of the present invention could generate code for use in systems using software variants of BASIC and/or C, and could be extended for portability purposes to systems utilizing Java™ and/or .NET™ languages.

The invention may be used for testing any type of video display, video monitor or other device that produces a video signal, and that is capable of providing information about the specifications and/or capabilities of the output video signal to an external device when coupled thereto, see, e.g., video display/monitor 14 in FIG. 1. The video signal producing device may also be capable of producing an audio signal, in which case, one or more specifications and/or capabilities of the audio signal is likewise provided and enables testing of the audio output of the device in the same manner as the video output is tested.

The external device obtains through the coupling to the video signal producing device, the information about the specifications and/or capabilities and based thereon, assembles one or more pre-defined tests from a memory component containing the tests, e.g., test database/repository 18 in FIG. 1, to enable testing of compliance of the video signal producing device to those specifications and/or capabilities. This compliance testing may entail generating video content at a video source generator, e.g., source generator 12 in FIG. 1, providing it to the video signal producing device, and determining the accuracy of the output of the video signal producing device to the input video content. A determination of the results of this test may be provided to an operator of the testing apparatus, i.e., the operator that couples the external device to the video signal producing device, and/or may be provided to the owner, manufacturer, user, etc. of the video signal producing device.

The coupling of the external device to the video signal producing device may be via an EDID/DDC bus, see, e.g., bus 20 in FIG. 1. Alternatively, the coupling may be via any wired or wireless means that enable transfer of signals/data/information between the external device and the video signal producing device.

The external device may be any device capable of coupling to a video signal producing device. Such devices that are also capable of providing video content via the coupling the video signal producing device are known to those skilled in the art to which this invention pertains.

The processor 16 may be integrated in the same electrical component as the external device, or may be separate therefrom and coupled thereto for signal/data/information transfer therebetween. This coupling may be wired or wireless. It is possible for the processor to be co-located in the same chassis as the external device or possibly even remote therefrom. In the latter situation, a network connection may be used to couple the processor to the external device. The processor may be any type of known processing or computational unit that is capable of parsing information, and performing the other functions described above. It is possible to use a single processor to handle all of the processing functions to facilitate use of the method described herein, or multiple processors, wherein each performs one or more of the described functions.

The repository of the tests, e.g., test database/repository 18 in FIG. 1, may be situated at the same location as the external device and processor, and at the testing location of the video signal producing device. Alternatively, it is possible to install the test database/repository at a central location and provide for networked access thereto from one or more processors situated at the same or different locations. Thus, multiple testing apparatus at the same location can all be linked to a common test database/repository whether situated at the same general location or at a remote location. By siting the test database/repository at a single location and enabling access thereto by multiple testing apparatus at different locations, it is much easier to update the test database/repository and ensure that all testing apparatus function with updated and current tests.

Several computer programs resident on transitory or non-transitory computer-readable media may be used in the invention and their function and non-limiting location are mentioned above. In the context of this document, computer-readable media or medium could be any non-transitory means that can contain, store, communicate, propagate or transmit a program for use by or in connection with the method, system, apparatus or device. The computer-readable medium can be, but is not limited to (not an exhaustive list), electronic, magnetic, optical, electromagnetic, infrared, or semi-conductor propagation medium. The medium can also be (not an exhaustive list) an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CD-ROM). The medium can also be paper or other suitable medium upon which a program is printed, as the program can be electronically captured, via for example, optical scanning of the paper or other medium, then compiled, interpreted, or otherwise processed in a suitable manner, if necessary, and then stored in a computer memory. Also, a computer program or data may be transferred to another computer-readable medium by any suitable process such as by scanning the computer-readable medium.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and is not limiting. The invention is limited only as defined in the claims and equivalents thereto.

The invention claimed is:

1. A method for preparing for testing a video signal producing device, comprising:
   interrogating the video signal producing device to cause an Extended Display Identification Data (EDID) data structure of the video signal producing device to be directed from the video signal producing device to a processor in response to the interrogation;
   selecting, at the processor based on the EDID data structure received from the video signal producing device, at least one test to perform on the video signal producing device, from among a plurality of different tests, each of the plurality of tests being associated with a specific content of EDID data structure such that when the received EDID data structure is parsed, one or more of the different tests is selected based on the parsed EDID data structure;
   retrieving the selected at least one test from a test database/repository that stores the plurality of different tests;

directing the selected at least one test to a source generator coupled to the video signal producing device; and then
generating and outputting from the source generator based on the selected at least one test, a signal to the video signal producing device to enable output of the video signal producing device in response to the signal received from the source generator to be used to assess compliance with at least one specification or capability of the video signal producing device,
whereby when the selected at least one test is performed on the video signal producing device, compliance of the video signal producing device with the at least one specification or capability of the video signal producing device is assessed and different EDID data structure received from the video signal producing device results in different selection of the at least one test.

2. The method of claim 1, wherein the at least one test comprises a test of functional capabilities of the video signal producing device.

3. The method of claim 1, wherein the at least one test comprises a test of performance capabilities of the video signal producing device.

4. The method of claim 1, wherein the at least one specification or capability relates to a video characteristic of the video signal producing device.

5. The method of claim 1, wherein the at least one specification or capability relates to an audio characteristic of the video signal producing device.

6. The method of claim 1, further comprising:
creating the at least one test by:
coupling another video signal producing device known to be compliant with the at least one specification or capability to the processor; and
determining parameters for the at least one test based on output of the another video signal producing device known to be compliant with the at least one specification or capability.

7. The method of claim 1, further comprising automatically generating code for storing on computer-readable media based on the selected at least one test and for execution by the processor interacting with the computer-readable media to provide for performance of the at least one test.

8. A method for testing a video signal producing device, comprising:
applying the selected at least one test to the video signal producing device obtained from the preparation of the video signal producing device in accordance with claim 1; and
viewing output of a response of the video signal producing device to the application of the selected at least one test to the video signal producing device.

9. A system for testing a video signal producing device, comprising:
a processor;
an interrogation module that directs an interrogation command to the video signal producing device to cause an Extended Display Identification Data (EDID) data structure of the video signal producing device to be directed from the video signal producing device to said processor;
a test database/repository containing a plurality of different tests, each of the plurality of tests being associated with a specific content of EDID data structure such that when the EDID data structure directed to said processor is parsed by said processor, one or more of the different tests is selected by said processor based on the parsed EDID data structure, and when each selected test is executed on the video signal producing device, a specification or capability of the video signal producing device is tested; and
a source generator that is directed by said processor to generate a signal based on each selected test and output the generated signal to the video signal producing device, such that output of the video signal producing device in response to the signal received from said source generator enables assessment of compliance with the specification or capability,
whereby said processor is configured to select based on the EDID data structure received from the video signal producing device in response to the interrogation command from said interrogation module, at least one test to perform on the video signal producing device, from among the plurality of different tests, to enable assessment of compliance of the video signal producing device with at least one specification or capability of the video signal producing device.

10. The system of claim 9, further comprising a bus for coupling said source generator to the video signal producing device.

11. The system of claim 9, wherein the at least one test comprises a test of functional capabilities of the video signal producing device.

12. The system of claim 9, wherein the at least one test comprises a test of performance capabilities of the video signal producing device.

13. The system of claim 9, wherein the at least one specification or capability relates to a video characteristic of the video signal producing device.

14. The system of claim 9, wherein the at least one specification or capability relates to an audio characteristic of the video signal producing device.

15. A method for testing a video signal producing device, comprising:
querying the video signal producing device via a bus to obtain an Extended Display Identification Data (EDID) data structure of the video signal producing device from the video signal producing signal in response to the query;
parsing, at a processor, the results of the query and generating a list including at least one specification or capability of the video signal producing device based on the EDID data structure obtained from the video signal producing device in response to the query;
selecting at least one test, from among a plurality of different tests, to perform to enable assessment of compliance of the video signal producing device with each of the at least one specification or capability of the video signal producing device on the list, each of the plurality of tests being associated with a specific content of EDID data structure such that when the EDID data structure obtained from the video signal producing device is parsed, one or more of the different tests is selected based on the parsed EDID data structure;
retrieving the selected at least one test from a test database/repository that stores the plurality of different tests;
assembling the selected at least one test,
directing the assembled at least one test to a source generator coupled to the video signal producing device; and then
generating and outputting a signal from the source generator to the video signal producing device based on the assembled at least one test to enable output of the video signal producing device in response to the signal received from the source generator to be used to assess compliance with the at least one specification or capability, whereby the assembled at least one test is performed on the video signal producing device to assess compliance of the video signal producing device with each of the at least one specification or capability of the video signal producing device.

16. The method of claim 15, wherein the at least one test comprises a plurality of tests, the step of assembling the at least one test comprising grouping the tests into a plurality of entry points, and grouping the entry points into a test plan, further comprising managing the entry points, using the processor and a user interface interacting with the processor, to enable selection of one or more specific ones of the entry points to execute or bypass.

17. The method of claim 15, wherein the at least one specification or capability relates to a video characteristic of the video signal producing device.

18. The method of claim 17, wherein the at least one specification or capability further relates to an audio characteristic of the video signal producing device, further comprising:
parsing, at the processor, the results of the query and generating a list including at least one audio specification or capability of the video signal producing device based on the EDID data structure obtained from the video signal producing device in response to the query;
selecting at least one audio test, from among a plurality of audio tests, to perform to enable assessment of compliance of the video signal producing device with each of the at least one audio specification or capability of the video signal producing device on the list; and
assembling the selected at least one audio test,
the assembled at least one audio test being performed on the video signal producing device to assess compliance of the video signal producing device with each of the at least one audio specification or capability of the video signal producing device.

* * * * *